US012743657B2

(12) United States Patent
Weber

(10) Patent No.: US 12,743,657 B2
(45) Date of Patent: Sep. 22, 2026

(54) SYSTEMS AND METHODS FOR GENERATING IMPROVED PROCESS MANAGEMENT USING A BIFURCATED MODEL TO GENERATE SYNTHETIC SETS OF PROCESSING STEPS

(71) Applicant: DEVGUILD LLC, Boston, MA (US)

(72) Inventor: Matthew Weber, Montclair, NJ (US)

(73) Assignee: DEVGUILD LLC, Boston, MA (US)

( * ) Notice: Subject to any disclaimer, the term of this patent is extended or adjusted under 35 U.S.C. 154(b) by 800 days.

(21) Appl. No.: 18/064,353

(22) Filed: Dec. 12, 2022

(65) Prior Publication Data

US 2024/0193465 A1 Jun. 13, 2024

(51) Int. Cl.

*G06N 20/00* (2019.01)
*G06F 18/21* (2023.01)
*G06F 18/2113* (2023.01)
*G06F 18/22* (2023.01)

(52) U.S. Cl.

CPC ......... *G06N 20/00* (2019.01); *G06F 18/2113* (2023.01); *G06F 18/22* (2023.01)

(58) Field of Classification Search

CPC ..................................................... G06N 20/00

See application file for complete search history.

(56) References Cited

U.S. PATENT DOCUMENTS 11,410,050 B2 * 8/2022 Baker .................... G06N 3/084

OTHER PUBLICATIONS

Xu, "Recurrent Convolutional Neural Network for Sequential Recommendation" 2019 (Year: 2019).*
Zhang "Bifurcation Spiking Neural Network" (Year: 2021).*

* cited by examiner

*Primary Examiner* — Van C Mang
(74) *Attorney, Agent, or Firm* — Foley & Lardner LLP

(57) ABSTRACT

Systems and methods are described herein for improvements to generating improved processing pathway management and determining optimal processing increments to complete the processing pathway using synthetic subsets of processing increments. For example, systems and methods are described herein for generating synthetic subsets of processing increments using models and algorithms.

20 Claims, 11 Drawing Sheets

| | A | B | C | D | E | J | N | R | V | Z |
|---|---|---|---|---|---|---|---|---|---|---|
| A | 4 | 4 | 3 | 3 | 3 | 1 | 2 | 1 | 1 | 1 |
| B | 4 | 5 | 4 | 3 | 4 | 1 | 3 | 2 | 1 | 1 |
| C | 3 | 4 | 4 | 3 | 3 | 0 | 2 | 1 | 1 | 1 |
| D | 3 | 3 | 3 | 3 | 2 | 0 | 1 | 0 | 1 | 1 |
| E | 3 | 4 | 3 | 2 | 4 | 1 | 3 | 2 | 0 | 0 |
| J | 1 | 1 | 0 | 0 | 1 | 1 | 1 | 1 | 0 | 0 |
| N | 2 | 3 | 2 | 1 | 3 | 1 | 3 | 2 | 0 | 0 |
| R | 1 | 2 | 1 | 0 | 2 | 1 | 2 | 2 | 0 | 0 |
| V | 1 | 1 | 1 | 1 | 0 | 0 | 0 | 0 | 1 | 1 |
| Z | 1 | 1 | 1 | 1 | 0 | 0 | 0 | 0 | 1 | 1 |

250

260

| | A | B | C | D | E | J | N | R | V | Z |
|---|---|---|---|---|---|---|---|---|---|---|
| A | 4 | 4 | 3 | 3 | 3 | 1 | 2 | 1 | 1 | 1 |
| B | 4 | 5 | 4 | 3 | 4 | 1 | 3 | 2 | 1 | 1 |
| C | 3 | 4 | 4 | 3 | 3 | 0 | 2 | 1 | 1 | 1 |
| D | 3 | 3 | 3 | 3 | 2 | 0 | 1 | 0 | 1 | 1 |
| E | 3 | 4 | 3 | 2 | 4 | 1 | 3 | 2 | 0 | 0 |
| J | 1 | 1 | 0 | 0 | 1 | 1 | 1 | 1 | 0 | 0 |
| N | 2 | 3 | 2 | 1 | 3 | 1 | 3 | 2 | 0 | 0 |
| R | 1 | 2 | 1 | 0 | 2 | 1 | 2 | 2 | 0 | 0 |
| V | 1 | 1 | 1 | 1 | 0 | 0 | 0 | 0 | 1 | 1 |
| Z | 1 | 1 | 1 | 1 | 0 | 0 | 0 | 0 | 1 | 1 |

270

| | A | B | C | D | E | J | N | R | V | Z |
|---|---|---|---|---|---|---|---|---|---|---|
| A | 4 | 4 | 3 | 3 | 3 | 1 | 2 | 1 | 1 | 1 |
| B | 4 | 5 | 4 | 3 | 4 | 1 | 3 | 2 | 1 | 1 |
| C | 3 | 4 | 4 | 3 | 3 | 0 | 2 | 1 | 1 | 1 |
| D | 3 | 3 | 3 | 3 | 2 | 0 | 1 | 0 | 1 | 1 |
| E | 3 | 4 | 3 | 2 | 4 | 1 | 3 | 2 | 0 | 0 |
| J | 1 | 1 | 0 | 0 | 1 | 1 | 1 | 1 | 0 | 0 |
| N | 2 | 3 | 2 | 1 | 3 | 1 | 3 | 2 | 0 | 0 |
| R | 1 | 2 | 1 | 0 | 2 | 1 | 2 | 2 | 0 | 0 |
| V | 1 | 1 | 1 | 1 | 0 | 0 | 0 | 0 | 1 | 1 |
| Z | 1 | 1 | 1 | 1 | 0 | 0 | 0 | 0 | 1 | 1 |

270

280

290

#01 - Initial seed of "A".

#07 Finished Set, with scores:
SoCo: 22,
SoTO: 25,
SoCoAverage: 3.142
SoToAverage: 3.571

#01 - Initial seed of "A".

#10 Finished Set, with scores:
SoCo: 20,
SoTO: 22,
SoCoAverage: 3.333
SoToAverage: 3.666

295

SYSTEMS AND METHODS FOR GENERATING IMPROVED PROCESS MANAGEMENT USING A BIFURCATED MODEL TO GENERATE SYNTHETIC SETS OF PROCESSING STEPS

BACKGROUND

Machine learning models and artificial intelligence have been adapted to improve many everyday processes that require human intelligence. The greatest advantage to utilizing artificial intelligence (e.g., machine learning, deep learning, etc.) is the ability to quickly process data and swiftly make determinations. However, despite the increased speed and accuracy of machine learning models, some technical problems limit their ability to be applied for practical applications. One major technical problem is that machine learning models may exhibit bias in the determinations that they make due to a lack of high-quality training data or poorly fitted model parameters. This problem is further exacerbated in data-sparse environments. This technical problem creates an issue when using artificial intelligence for practical applications such as those related to generating improved processing pathways.

SUMMARY

Systems and methods are described herein for improvements to the use of artificial intelligence models for practical applications, particularly those featuring environments with a lack of high-quality training data, poorly fitted model parameters, and/or data-sparse environments. More specifically, these improvements address the technical problems raised when attempting to adapt artificial intelligence models to practical applications such as generating improved processing pathways. For example, existing models and algorithms for optimizing processing pathways rely on conventional shortest-path algorithms (e.g., Dijkstra's algorithm). These algorithms calculate the shortest to other nodes in a graph (e.g., representing the various processing pathways network) from a fixed node. However, these conventional approaches are only useful in static environments (e.g., environments in which all nodes in the graph are known and unchanging). These conventional approaches cannot deal with dynamic systems in which the availability, distance between, and/or location of nodes within the processing network may change. Furthermore, there are no available training data or model parameters to quantify the characteristics of these dynamic systems. Thus, conventional approaches fail in this environment.

In contrast to the conventional approaches, systems and methods are described herein for generating synthetic sets of processing increments using artificial intelligence models. For example, the system may use the synthetic sets of processing increments (e.g., sets of connections, steps, etc., along a processing route) to generate improved processing pathway management and determine an optimal processing increment (e.g., an optimal connection, step, etc.) complete processing pathways (e.g., to link existing processing pathways). That is, the systems and methods use the artificial intelligence models to generate synthetic sets of processing increments (e.g., replicating a dynamic system in which the availability, distance between, and/or location of nodes within the processing network may change). Furthermore, these sets may be subsets of other available processing increments.

The systems and methods utilize a bifurcated model to achieve the aforementioned technical benefit. Specifically, in response to the system receiving a request to determine a processing pathway, the system uses one or more initial models to generate, from all available processing increments, a first subset of processing increments for the processing pathway. For example, the initial models may retrieve all available processing increments (e.g., even those not related to the processing pathway) and generate a set of potential increments for different processing pathways (e.g., using the different initial models). The system may then use this set of potential increments to generate synthetic subsets of processing pathways using only the processing increments in the set of potential increments. The system then determines the frequency at which specific processing increments appear in the synthetic subsets of processing pathways. Based on this frequency, the system determines a recommendation for a particular set. By using the bifurcated model arrangement, the first level of models may identify potential processing increments for synthetic subsets of processing pathways based on a variety of models. The system may then use this pool of potential processing increments to generate the synthetic subsets of processing pathways. Accordingly, the bifurcated model described herein overcomes the technical problems associated with a conventional model by being able to be applied to a dynamic system in which the availability, distance between, and/or location of nodes within the processing network may change.

In one aspect, the system may receive a first request to generate a synthetic subset of processing increments to perform a first processing pathway. The system may, in response to receiving the first request, transmit to a first artificial intelligence model a first command to generate, from a first set of available processing increments, a first subset of processing increments to perform the first processing pathway, wherein a first subset comprises a first processing increment and a second processing increment. The system may, in response to receiving the first request, transmit to a second artificial intelligence model a second command to generate, from the first set of available processing increments, a second subset of processing increments to perform the first processing pathway, wherein a second subset comprises a third processing increment and a fourth processing increment. The system may select the first processing increment, the second processing increment, the third processing increment, and the fourth processing increment, for a second set of available processing increments for performing the first processing pathway, based on the first processing increment, the second processing increment, the third processing increment, and the fourth processing increment being included in the first subset of processing increments or the second subset of processing increments. The system may input the second set of available processing increments into a third artificial intelligence model to determine a plurality of synthetic subsets processing increments to perform the first processing pathway, wherein processing increments for a plurality of synthetic subsets are limited to those occurring in the second set of available processing increments. The system may generate a co-occurrence matrix based on the first processing increment, the second processing increment, the third processing increment, and the fourth processing increment, wherein the co-occurrence matrix indicates a number of times each of the first processing increment, the second processing increment, the third processing increment, and the fourth processing increment occurred in a first synthetic subset of a plurality of synthetic subsets. The system may determine a first rating of a first synthetic subset based on the co-occurrence matrix. The system may generate for display, on a user interface, a first recommendation to perform the first processing pathway using the first synthetic subset based on the first rating.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIGS. 2A-2H respectively show illustrative examples for generating improved process management using synthetic subsets of processing steps, in accordance with one or more embodiments.

DETAILED DESCRIPTION OF THE DRAWINGS

In the following description, for the purposes of explanation, numerous specific details are subset forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
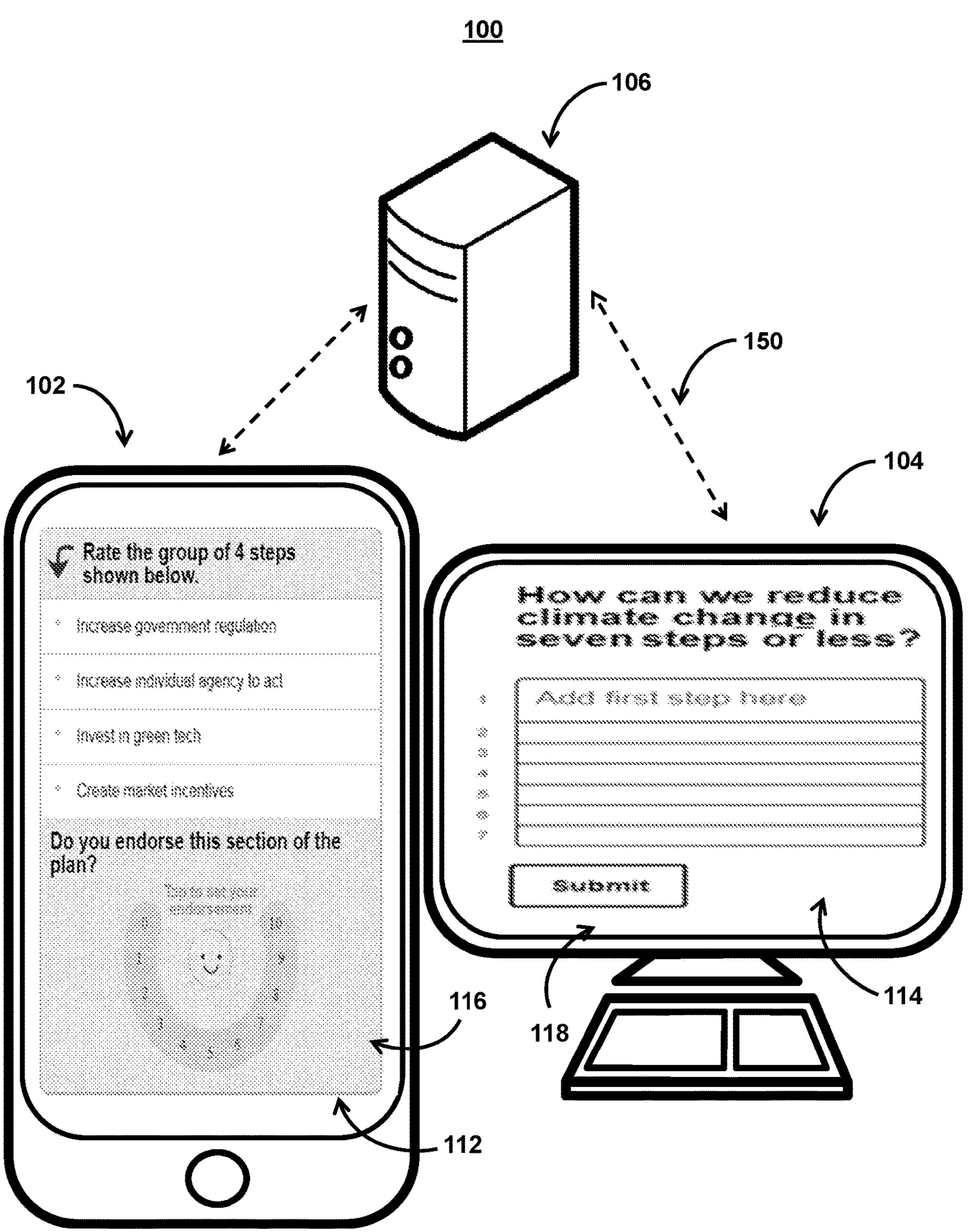
FIG. 1 shows an illustrative system for generating improved process management using synthetic subsets of processing steps, in accordance with one or more embodiments.

As shown in FIG. 1, system 100 may include mobile device 102 and user terminal 104. While shown as a smartphone and personal computer, respectively, in FIG. 1, it should be noted that mobile device 102 and user terminal 104 may be any computing device, including, but not limited to, a laptop computer, a tablet computer, a hand-held computer, other computer equipment (e.g., a server), including "smart," wireless, wearable, and/or mobile devices. FIG. 1 also includes server 106. Server 106 may alternatively be any computing device as described above and may include any type of mobile terminal, fixed terminal, or other device. It should also be noted that system 100 is not limited to three devices. Users may, for instance, utilize one or more other devices to interact with one another, one or more servers, or other components of system 100. It should be noted that while one or more operations are described herein as being performed by particular components of system 100, those operations may, in some embodiments, be performed by other components of system 100. As an example, while one or more operations are described herein as being performed by components of user terminal 104, those operations may, in some embodiments, be performed by components of server 106. In some embodiments, the various computers and systems described herein may include one or more computing devices that are programmed to perform the described functions.

System 100 may receive, from a computing device (e.g., mobile device 102 or user terminal 104), a first request to generate a synthetic subset of processing increments to perform a first processing pathway. For example, system 100 may generate for display, on a user interface (e.g., user interface 112 and user interface 114 on mobile device 102 and user terminal 104, respectively), a first recommendation to perform the first processing pathway using the first synthetic subset based on the first rating.

Users may interact with the system using a user interface. As referred to herein, a "user interface" may comprise a human-computer interaction and communication in a device and may include display screens, keyboards, a mouse, and the appearance of a desktop. For example, a user interface may comprise a way a user interacts with an application or a website.

In some embodiments, the user interface may comprise a graphical display that allows a user to interact with and/or perform generating improved processing pathway management and determining optimal processing increments to complete processing pathway using synthetic subsets of processing increments. The graphical display may include a plurality of objects, each of which may have corresponding characteristics. An object's characteristics may comprise any characteristics that distinguish one object from another. For example, an object characteristic may be media-related information (e.g., ordering, heading information, titles, descriptions, rating information (e.g., parental control ratings, critic's ratings, etc.), source code data (e.g., HTML, source code headers, etc.), genre or category information, subject matter information, author/actor information, logo data, or other identifiers for the content provider), media format, file type, object type, objects appearing in the content (e.g., product placements, advertisements, keywords, context), or any other suitable information used to distinguish one object from another. In some embodiments, the object characteristic may also be human-readable text.

As shown in FIG. 1, user interface 112 may comprise first content 116, whereas user interface 114 may comprise second content 118. As referred to herein, "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Data may be recorded, played, displayed, or accessed by user equipment devices but can also be part of a live performance. In some embodiments, data may include a text string.

In some embodiments, the system may use object characteristics to automatically display recommendations of objects. For example, the system may use the object characteristic to determine whether an object is of interest to the user based on a comparison of the object characteristic and user profile data for the user. In some embodiments, an object characteristic may include information that describes the object and/or is stored with the object. For example, an object may correspond to a title or header that describes information that is generated for display as a user selects an object.

In some embodiments, the system may parse the contents of object characteristics (e.g., information to which the object relates) and metadata describing the characteristic. For example, the metadata may indicate a context of the characteristic, and the characteristic may comprise human-readable text.

As shown in FIG. 1, first content 116 and second content 118 comprises content related to user selection and/or creation of a processing pathway. The user selection of the processing pathway may comprise a user input of one or more processing increments. As referred to herein, a "processing pathway" may include any route or course taken in getting from a starting point (e.g., a starting state of a system) to a destination (e.g., an ending state or goal). For example, the processing pathway may correspond to a route between nodes of a computer network. In another example, the processing pathway may comprise a detailed proposal with steps to achieve a goal. In some embodiments, the processing pathway may comprise a subset of steps to achieve a predetermined goal. In some embodiments, the processing pathway may comprise a subset of steps determined by using one or more models. These models may include one or more machine learning models, artificial intelligence models, etc. (which may be referred to collectively as "models" herein). In some embodiments, the processing pathway may comprise a synthetic subset generating a co-occurrence matrix.

As referred to herein, a "processing increment" may comprise an increment (or step) within a processing pathway. For example, in embodiments in which the processing pathway may correspond to a route between nodes of a computer network, a processing increment may comprise a node within the network. In embodiments in which the processing pathway may comprise a detailed proposal with steps to achieve a goal, the processing increment may include a step within the detailed proposal to achieve the goal. In some embodiments, the processing increment may comprise a step determined by an artificial intelligence model to complete a processing pathway. In some embodiments, the processing increment may comprise an element within a subset to complete a processing pathway. In some embodiments, the processing increment may comprise a suggested procedure to complete a processing pathway.

The system 100 may, in response to receiving the first request, transmit to a first artificial intelligence model a first command to generate, from a first set of available processing increments, a first subset of processing increments to perform the first processing pathway. A first subset may include a first processing increment and a second processing increment.

As referred to herein, an "artificial intelligence model" may include a machine learning model that may perform actions or tasks within the system. In some embodiments, an artificial intelligence model may be replaced with any intelligent entity, such as a human. As such, such embodiments referring to the use of artificial intelligence models and/or "model" may equally be applied to and/or applicable to embodiments using users or agents.

The system 100 may transmit to a second artificial intelligence model a second command to generate, from the first set of available processing increments, a second subset of processing increments to perform the first processing pathway. A second subset may include a third processing increment and a fourth processing increment.

The system 100 may select the first processing increment, the second processing increment, the third processing increment, and the fourth processing increment, for a second set of available processing increments for performing the first processing pathway based on the first processing increment, the second processing increment, the third processing increment, and the fourth processing increment being included in the first subset of processing increments or the second subset of processing increments.

The system 100 may input the second set of available processing increments into a third artificial intelligence model to determine a plurality of synthetic subsets of processing increments to perform the first processing pathway. Processing increments for a plurality of synthetic subsets are limited to those occurring in the second set of available processing increments.

The system 100 may generate a co-occurrence matrix based on the first processing increment, the second processing increment, the third processing increment, and the fourth processing increment. The co-occurrence matrix indicates a number of times each of the first processing increment, the second processing increment, the third processing increment, and the fourth processing increment occurred in a first synthetic subset of a plurality of synthetic subsets.

As referred to herein, a "co-occurrence matrix" may comprise a collection of information that indicates relationships between processing increments in different processing pathways. For example, a co-occurrence matrix may include a table that represents the count of times within a corpus of subsets that a given processing increment appears in the same subset with another processing increment. In some embodiments, the co-occurrence matrix may comprise a table that indicates a number of times each of the first processing increment, the second processing increment, the third processing increment, and the fourth processing increment occurred in a synthetic subset of the plurality of synthetic subsets. In some embodiments, the co-occurrence matrix may comprise a table that indicates a number of times the first processing increment occurred in parallel with the second processing increment in a synthetic subset of the plurality of synthetic subsets. In some embodiments, the co-occurrence matrix may comprise a table to determine which processing increments should be grouped together to generate an efficient processing pathway. The system 100 may determine a first rating of a first synthetic subset based on the co-occurrence matrix.

With respect to the components of mobile device 102, user terminal 104, and server 106, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing circuitry. Each of these devices may also include a user input interface and/or user output interface (e.g., a display) for use in receiving and displaying data. For example, as shown in FIG. 1, both mobile device 102 and user terminal 104 include a display upon which to display data. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to the verification service (e.g., either transmitting verification requests, receiving verification requests, and/or processing verification requests). For example, the processors may be programmed to provide information processing capabilities in computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein. The electronic storages may be used to store a database listing a hierarchical tree for the first object and relationships between objects and tree nodes in the hierarchical tree.

In some embodiments, an application that generates a user interface that provides a first recommendation to perform the first processing pathway using the first synthetic subset based on the first rating may be implemented in an API ("Application Programming Interface") layer on one or more devices in FIG. 1. For example, system 100 also includes API layer 150. API layer 150 (which may be A REST or Web services API layer) may provide a decoupled interface to data and/or functionality of one or more applications. API layer 150 may provide a common, language-agnostic way of interacting with an application. Web services APIs offer a well-defined contract, called WSDL ("Web services description language"), that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in enterprises for publishing internal services, as well as for exchanging information with partners in B2B ("Business-to-business") transactions.

API layer 150 may use various architectural arrangements. For example, system 100 may be partially based on API layer 150, such that there is a strong adoption of SOAP and RESTful Web services, using resources like Service Repository and Developer Portal, but with low governance, standardization, and separation of concerns. Alternatively, system 100 may be fully based on API layer 150, such that separation of concerns between layers like API layer 150, services, and applications are in place.

In some embodiments, the system architecture may use a microservice approach. Such systems may use two types of layers: Front-End Layer and Back-End Layer where microservices reside. In this kind of architecture, the role of the API layer 150 may provide integration between Front-End and Back-End. In such cases, API layer 150 may use RESTful APIs (exposition to front-end or even communication between microservices). API layer 150 may use AMQP (e.g., Kafka, RabbitMQ, etc.). API layer 150 may use incipient usage of new communications protocols such as gRPC, Thrift, etc.

In some embodiments, the system architecture may use an open API approach. In such cases, API layer 150 may use commercial or open-source API Platforms and their modules. API layer 150 may use the developer portal. API layer 150 may use strong security constraints applying WAF ("Web application firewall") and DDOS ("Distributed denial of service") protection, and API layer 150 may use RESTful APIs as standard for external integration.

Figure 2A:
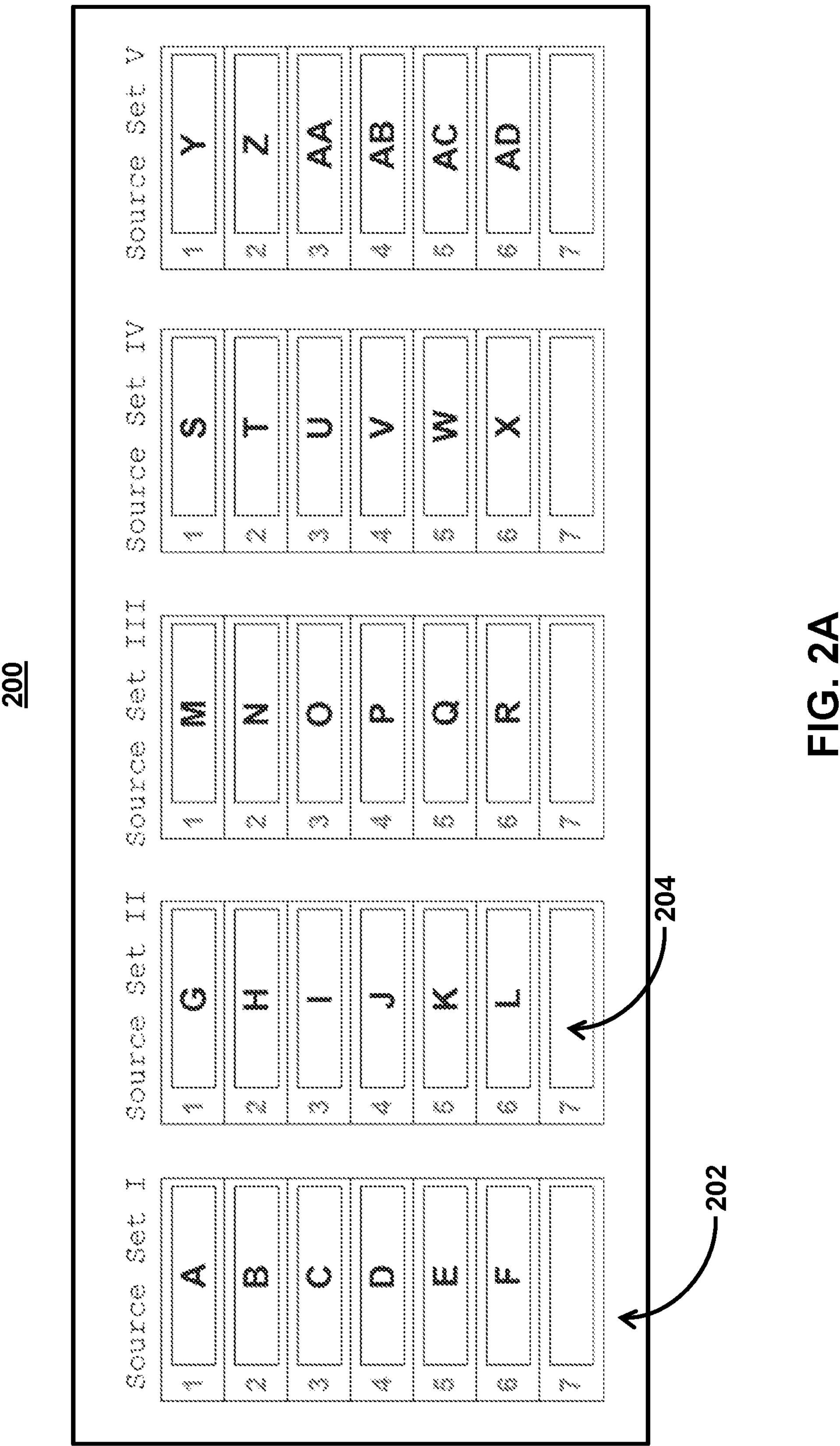

FIG. 2A-H shows illustrative examples for generating improved process management using synthetic subsets of processing steps in accordance with one or more embodiments. For example, FIG. 2A shows the first subset of processing increments to perform the first processing pathway. The first subset may include a first processing increment and a second processing increment. In some embodiments, the first artificial intelligence model may generate multiple subsets of processing increments. FIG. 2A shows the process 200 of generating subsets through tasks. As referred herein, a "task" may include a command to a model to generate subsets of processing increments. For example, the model may generate (and/or may be trained to generate) a first subset of processing increments for performing the task (e.g., a first processing pathway to the performance of the task using a first algorithm).

As shown in process 200, the system may generate numerous lists of processing increments for various processing pathways to an inputted goal. For example, the system may generate processing pathway 202 and processing pathway 204. Processing pathway 202 and processing pathway 204 may comprise respective lists of processing increments. Processing pathway 202 and processing pathway 204 may be generated by the system based on one or more models and/or algorithms. To do so, the system may pull all available processing increments to determine one or more subsets of the processing increments (e.g., as shown in processing pathway 202 and processing pathway 204).

For example, using the first algorithm, the system may determine a first subset from the first set of available processing increments. In some embodiments, the system, using the first algorithm, may synthesize subsets based on the data collected from tasks it sends to server 106. In some embodiments, process 200 may include the second artificial intelligence model training to generate a second subset of processing increments for performing the first processing pathway using a second algorithm. The second algorithm selects a second subset of processing increments from the first set of available processing increments.

Figure 2B:
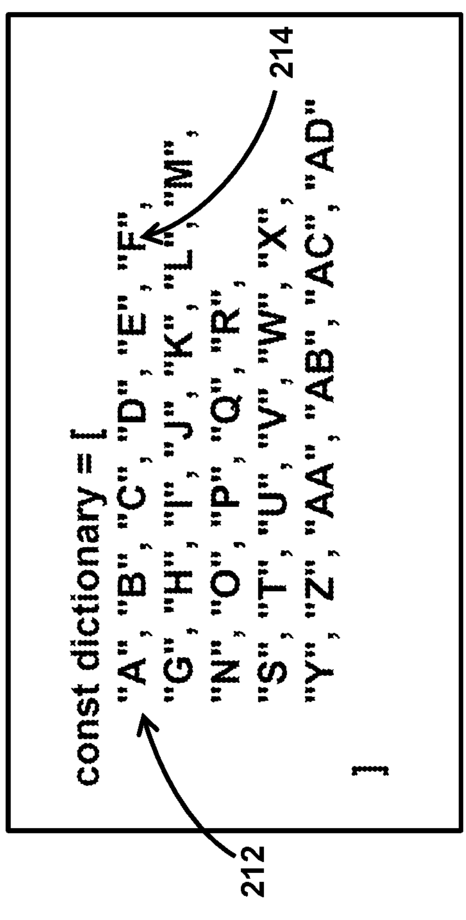

FIG. 2B shows the first set of available processing increments 210. The first set of available processing increments 210 may include all the unique elements from all the subsets generated by the first and second models. For example, the system may pull all processing increments identified in processing pathway 202 (FIG. 2A) and processing pathway 204 (FIG. 2B). The system may then identify individual processing increments such as processing increment 212 (e.g., "A") and processing increment 214 (e.g., "F").

Figure 2C:
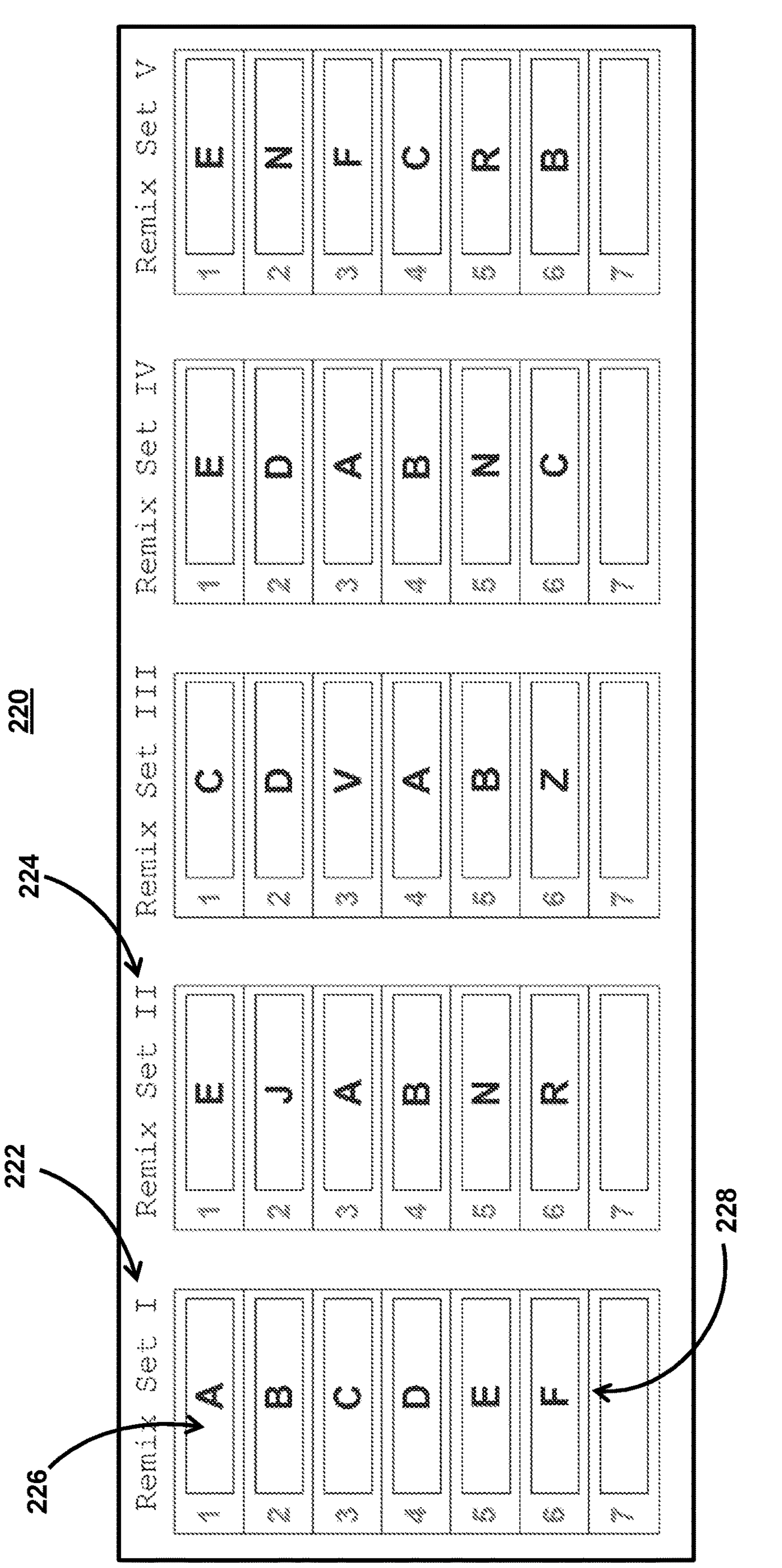

FIG. 2C shows process 220 of generating a second set. For example, the system 100 may generate a second set of available processing increments using the previously generated subsets from process 200. The system may select the first processing increment, the second processing increment, the third processing increment, and the fourth processing increment, for the second set of available processing increments for performing the first processing pathway, based on the first processing increment, the second processing increment, the third processing increment, and the fourth processing increment being included in the first subset of processing increments or the second subset of processing increments.

For example, FIG. 2C shows a plurality of synthetic subsets (e.g., synthetic subset 222 and synthetic subset 224). The system may generate these synthetic subsets based on processing increment 226 (e.g., "A") and processing increment 228 (e.g., "F"). For example, the system may retrieve the first set of available processing increments 210 (FIG. 2B). The system may select processing increment 226 (e.g., "A") and processing increment 228 (e.g., "F") for use in generating one or more of synthetic subset 222 and synthetic subset 224 based on the processing increments appearing in the first set of available processing increments 210 (FIG. 2B).

Figure 2D:
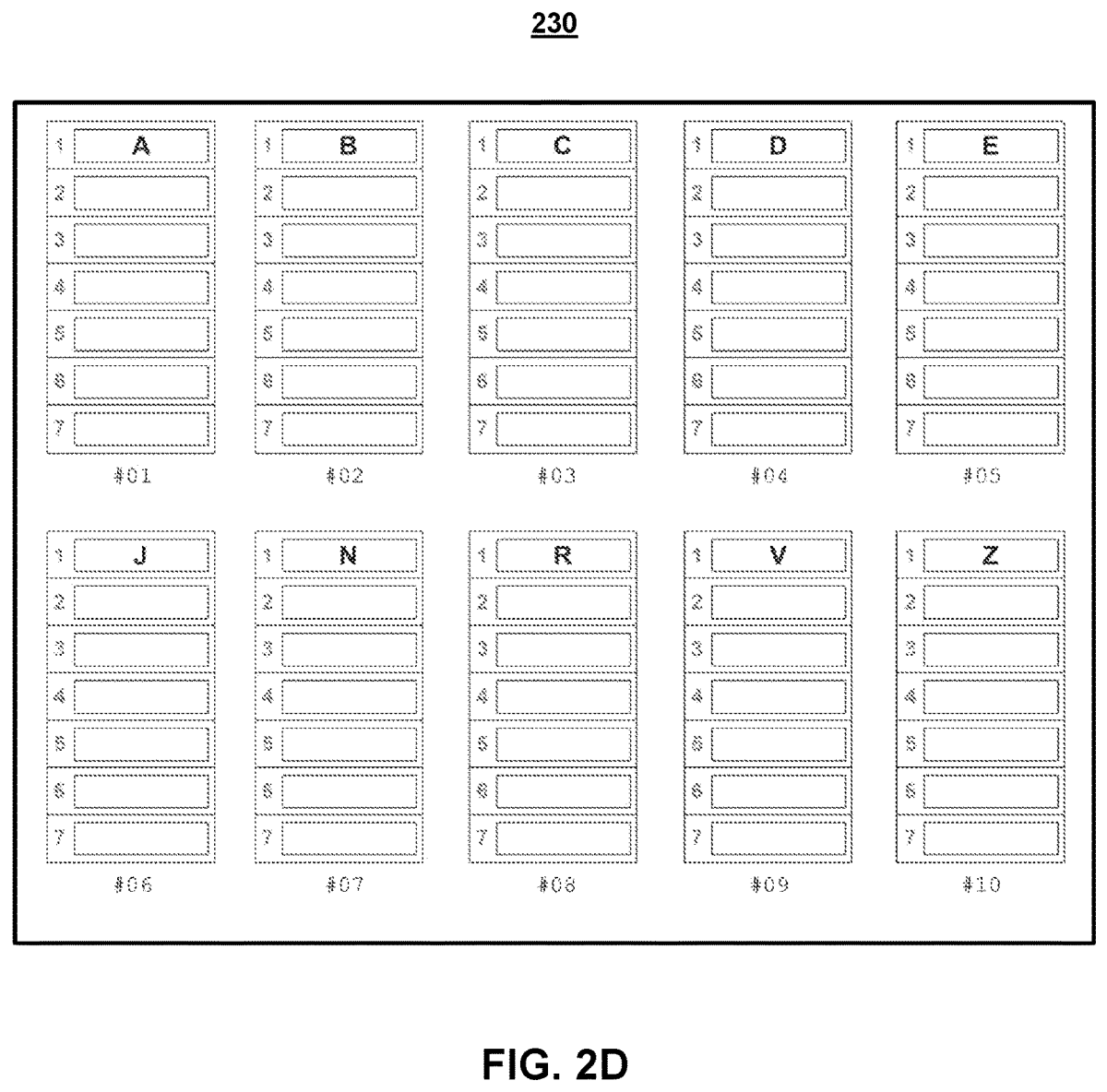

FIG. 2D shows process 230 for building a synthetic subset (e.g., the synthetic subsets shown in FIG. 2C). For example, the system may input the second set of available processing increments into a third artificial intelligence model to determine a plurality of synthetic subsets processing increments to perform the first processing pathway. Processing increments for a plurality of synthetic subsets are limited to those occurring in the second set of available processing increments. The third artificial intelligence model is trained to generate synthetic subsets of processing increments for performing the first processing pathway using the third algorithm. The third algorithm generates synthetic subsets of processing increments using the first subset of processing increments and the second subset of processing increments from process 200.

In some embodiments, the third artificial intelligence model is trained to generate synthetic subsets of processing increments for performing the first processing pathway using the third algorithm. The third algorithm generates synthetic subsets of processing increments from the first subset of processing increments and the second subset of processing increments. For example, the third artificial intelligence model may select a processing increment to start a synthetic subset with.

In some embodiments, server 106 can start to discover what processing increments are most often grouped with others. In some embodiments, the system 100 may determine which processing increments are most important.

For example, the third artificial intelligence model may retrieve processing increments from a set and use each one to seed a different competing set. As such, the system may "seed" various subsets with a beginning step. For example, the system may select a beginning processing increment in order to build a recommended processing pathway. As the processing pathways are generated the system may use any previously selected processing increment as a beginning increment for the next increment's determination. For example, the system may predict a probability of a variety of outcomes for each potential next processing increment based on the previous increment (or based on one or more previous increments). By doing so, the system may quantitatively account for risk and/or different potential variables in forecasting and decision-making. As such, the system may use random samples of parameters (e.g., potential processing increments) to explore the behavior of a complex system.

For example, unlike a conventional forecasting model, the model may predict a set of outcomes (e.g., subsets of processing increments) based on an estimated range of values versus a set of fixed input values. By doing so, the model generates possible results by leveraging a probability distribution, such as a uniform or normal distribution, for any variable (e.g., a potential processing increment, an order of processing increments, a beginning processing increments, etc.) that has inherent uncertainty. The model, then, recalculates the results (e.g., potential processing pathways) iteratively, each time using a different set of random processing increments from the selected set.

Figure 2E:
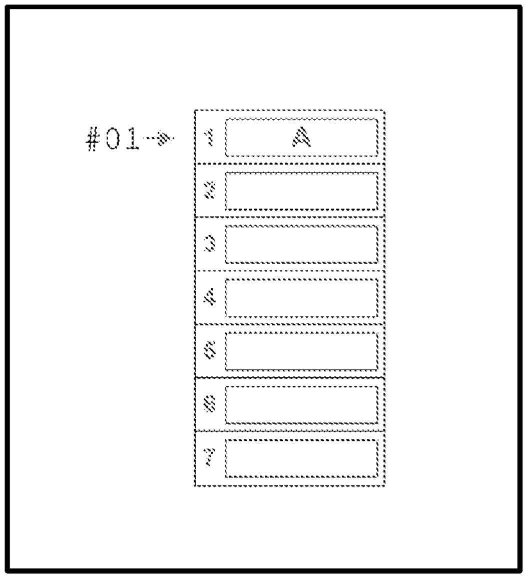
Figure 2F:
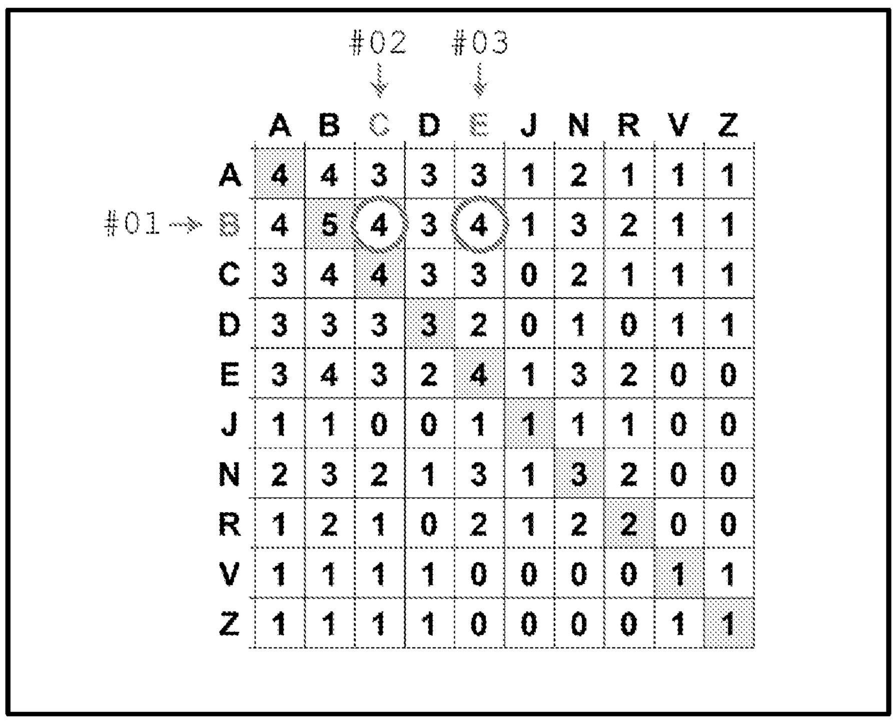

FIGS. 2E and 2F show processes 240, 250, 260, and 270 for populating a synthetic set. For example, in process 240, server 106 may process the data from process 230 to generate a co-occurrence matrix. In processes 250, 260, and 270, the system may loop through each processing pathway using the co-occurrence matrix to add the next processing increment to the table in process 230. The system may generate a co-occurrence matrix based on the first processing increment, the second processing increment, the third processing increment, and the fourth processing increment, wherein the co-occurrence matrix indicates a number of times each of the first processing increment, the second processing increment, the third processing increment, and the fourth processing increment occurred in a first synthetic subset of the plurality of synthetic subsets.

The system may add the new processing step to the existing processing pathway if the processing pathway has not reached the maximum limit and the new processing step does not appear in the processing pathway already. In some embodiments, the system may use natural language processing algorithms to determine whether a similar processing increment is present in the processing pathway. In some embodiments, the system 100 may order the processing increments in chronological order.

For example, as shown in the co-occurrence matrix of process 260, the system may determine a value corresponding to each potential next processing increment. When using "A" as beginning increment both repeating "A" as well as progressing to "B" has a value of four. The system may thus determine to generate two synthetic subsets (one featuring "A" and "A" and one featuring "A" and "B"). However, the system may avoid duplicating similar elements already in system (e.g., the system may eliminate duplicate increments). The system may perform similar efficiency filters by not only removing duplicates, but also processing increments similar uses (e.g., based on metadata and/or other descriptions of a processing increment). For example, the system may retrieve summaries of each potential processing increment and may determine (e.g., based on natural language processing) a similarity between the increments. Additionally or alternatively, the system may perform this filtering with generating an initial set (e.g., prior to determining any subsets).

Additionally or alternatively, the system may apply efficiency filters to remove low value processing increments from consideration. For example, the system may determine a minimum co-occurrence value for each potential processing increment for that processing increment to be considered. In some embodiments, the system may dynamically adjust the threshold minimum based on the processing pathway, beginning increment, the processing increment itself, a minimum number of elements in the set, a maximum number of elements in the set, etc.). The efficiency filter may also analyze clusters of features to determine values for the last two processing increments or what processing increment follows the last three processing increments.

In some embodiments, the threshold for the efficiency filter may be set as a floating point number between 0 and 1 and/or may be considered a percentile metric. For example, if an item or cluster's co-occurrence percentile meets or exceed the threshold, then that item or cluster should be considered for a subset.

For example, as shown in the co-occurrence matrix of process 260, "B" has the highest co-occurrence value, and would by default be included within a threshold of a value of 1. However, if the system changed the efficiency filter to 0.7, then elements "C", "D", and "E" would also be explored by the system as each of these potential processing increments are in the 0.75th percentile of co-occurrences values.

For example, as shown in FIG. 2F the system may determine based on the co-occurrence matrix for "B" that #01 "B" is the previous element and #02 and #03 both have the same high co-occurrence value (e.g., four). As such, the system determines to use both of them (e.g., creating a split). For example, because the system determines that more than one value has being suggested for the next processing increment (e.g., based on the value in the co-occurrence matrix), the system generates a split on the subset (or "forks" the subset) creating two new potential processing pathways.

Figure 2G:
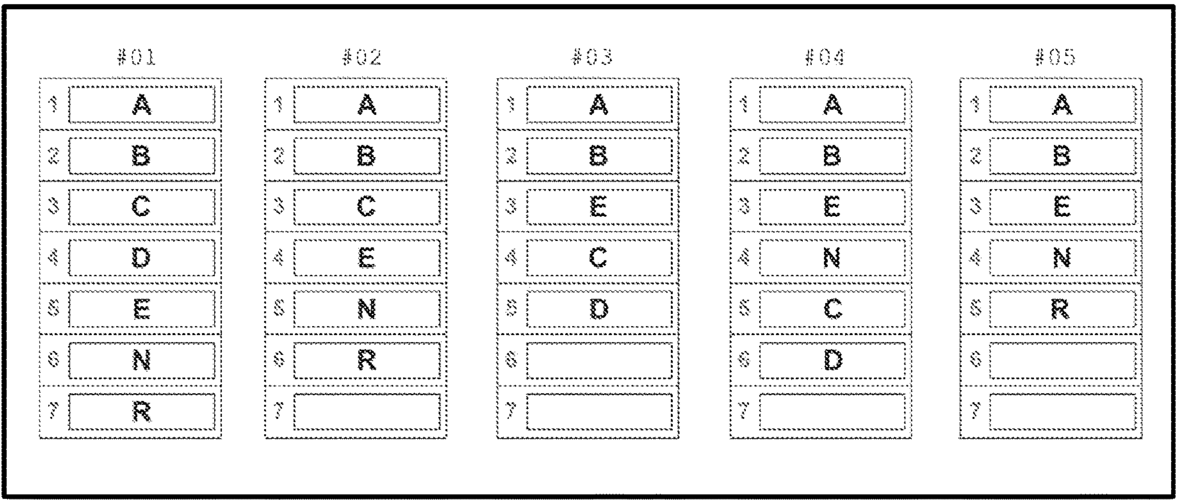
Figure 2G:
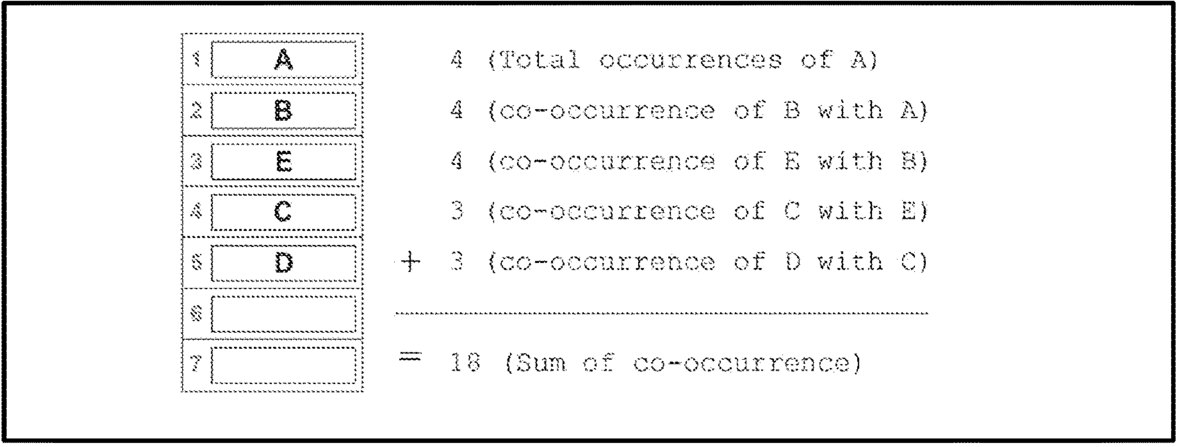

FIG. 2G shows processes 270 and 280 to determine the first rating of the first synthetic subset based on the co-occurrence matrix. For example, the system may determine a first sum metric for the first synthetic set. The first sum metric for the first synthetic subset may include a total number of occurrences of the first processing increment in the first synthetic subset and a total number of times the first processing increment in the first synthetic subset occurred with the second processing increment in the first synthetic subset in the plurality of synthetic subsets and a total number of times any additional processing increment in the first synthetic subset occurred with a previous processing increment in the first synthetic set.

For example, the system may use a sum metric as the primary metric for determining the highest value synthetic subset. As such, the system may determine a sum metric for each synthetic subset and then choose the subset with the highest number. To do so, the system may initialize the sum metric value to equal 0. The system may then add the total occurrence of the first processing increment to the sum metric (e.g., if processing increment "A" occurred in four subsets, then the system adds four to the sum). For each additional processing increment, the system determines the number of times it co-occurs with the previous processing increment and add that number to the sum metric. The system then sums all of the co-occurrences and the total number of occurrences of the first processing increment to determine the sum metric. The system may then order all of the synthetic subsets by their respective sum metric and recommends the synthetic subset with the highest value. Additionally or alternatively, the system may base recommendations on the synthetic subset with the highest value of total occurrences, sum value of all total occurrences values, and/or other metrics.

In instances of similar or the same sum metric, sum value of all total occurrences values, and/or other metrics, the system may use one or more tie breakers. For example, the system may determine how many total times something is seen throughout the entire corpus of available processing increments. For example, when evaluating unordered sets, any set that has the same processing increments but a different order is considered equivalent and discarded. By doing so, the system may have functionally equivalent sets being recommended.

In some embodiments, the system may use a sum metric average. For example, the system may determine a sum metric and divide it by total number of processing increments in a subset. The system may determine a higher value indicating a stronger combination of processing increments (even in a subset with a low number of and/or having low value processing increments). Additionally, the use of the sum metric average reduces the bias against the sum metric of larger (e.g., longer) subsets.

In some embodiments, to avoid an analysis-paralysis in the model (particularly those using human analysts) and to optimize the process, the system may assign cohorts for the generating synthetic subsets. For example, the system may set a maximum number of reference sets in a given cohort. A "reference set" may comprise a set of processing increments provided to be used as part of the generation of the synthetic subsets. The cohort may have a limit on the total number of users as well as a total number of reference sets. Additionally or alternatively, the system may set other limits and/or conditions (e.g., in order to even distribute any reference sets.

In some embodiments, if a cluster feature step is performed, the system may determine a step that typically follows the trailing processing increments. For example, the system may determine what processing increment follows the last two processing increments or what processing increment follows the last three processing increments.

For example, the system may generate the predictive model by identifying both the dependent variable to be predicted (e.g., a potential processing increment, an order of processing increments, an initial processing increments, etc.) and the independent variables (e.g., a previous increment, on one or more previous increments, a final increment, etc.) that will drive the prediction. The system may then specify probability distributions of the independent variables. The system may use historical data and/or an analyst's subjective judgment to define a range of likely values and assign probability weights for each. The system may then run simulations repeatedly, generating random values of the independent variables. The system may then do this until enough results are gathered to make up a representative sample of the near infinite number of possible combinations of the potential processing increments (and orders thereof) of a selected set. As such, the system may exhaustively test every permutation based on an original seeding and then branching when items have a same rating.

FIG. 2G shows process 290 to generate for display on a user interface (e.g., mobile device 102 and user terminal 104), a first recommendation to perform the first processing pathway using the first synthetic subset based on the first rating. For example, the system may determine a second rating of a second synthetic subset of the plurality of synthetic subsets based on the co-occurrence matrix. Determining a second rating of the first synthetic subset based on the co-occurrence matrix may include: determining a first sum metric for the second synthetic set. The first sum metric for the second synthetic subset may include a sum of a total number of occurrences of the first processing increment in the first synthetic subset and a total number of times the first processing increment in the first synthetic subset occurred with the second processing increment in the second synthetic subset in the plurality of synthetic subsets and a total number of times any additional processing increment in the first synthetic subset occurred with a previous processing increment in the second synthetic set. The system may then compare the first rating to the second rating. The system may determine the first sum metric for the first rating is greater than the first sum metric for the second rating, and the system may select a recommendation to recommend the first synthetic set.

Figure 2H:
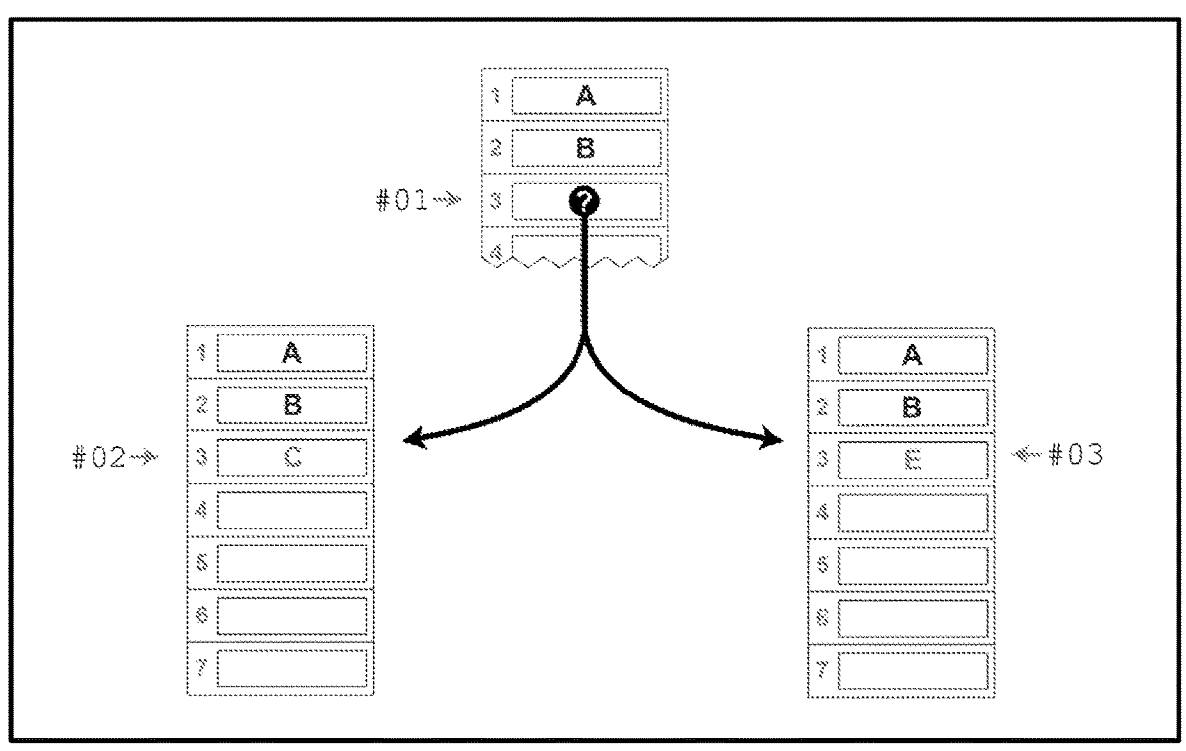

FIG. 2H shows process 295 to split an existing synthetic subset into two separate new subsets. For example, according to process 270, two values were identified on the co-occurrence matrix that were equal. In this embodiment, the system may determine to fork the existing synthetic subset into two separate subsets, wherein the first subset and second subset will add the new processing increment, respectively. As discussed above, the system may exhaustively test every permutation based on an original seeding and then branching when items have the same rating. As shown in FIG. 2H, process 295 has split an existing synthetic subset (e.g., a partially completed processing pathway) into two separate new subsets. The system may determine to perform this split based on the rating. For example, the system may determine the first sum metric for the first rating is the same as the first sum metric for the second rating.

Figure 3:
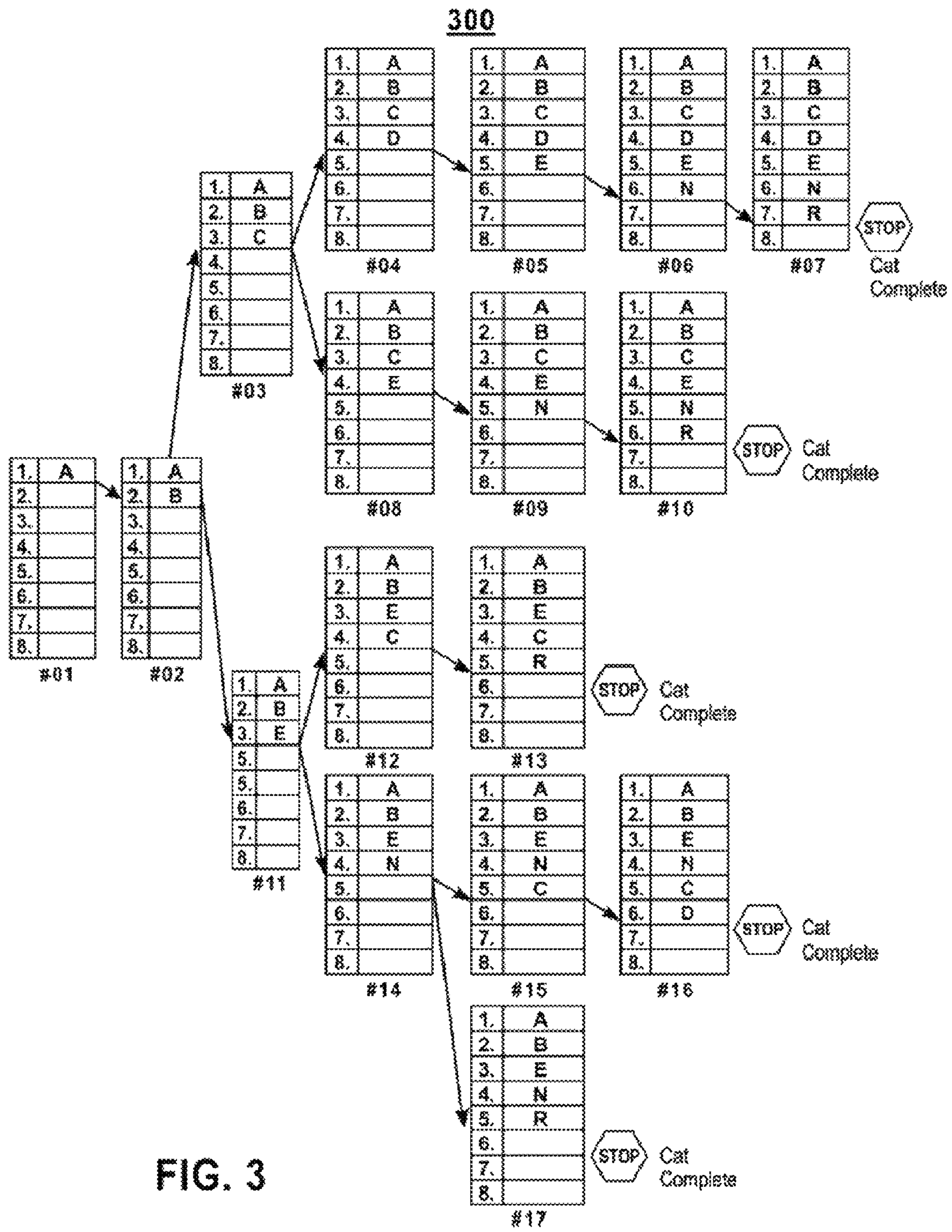
FIG. 3 shows an illustrative example of generating synthetic subsets of processing increments for performing the first processing pathway, in accordance with one or more embodiments.

FIG. 3 shows an illustrative example of generating synthetic subsets of processing increments for performing the first processing pathway, in accordance with one or more embodiments. For example, the system may generate multiple synthetic subsets from one processing increment using process 295. In one embodiment, in response to the system inputting the second set of available processing increments into a third artificial intelligence model to determine a plurality of synthetic subsets of processing increments to perform the first processing pathway, the system may fork an existing synthetic subset into two synthetic subsets using the processes 260 and 270 to use a co-occurrence matrix to generate the synthetic subset shown in FIG. 2F. In some embodiments, the system may repeat, adding more processing increments to each subset until the maximum number of processing increments for a subset is met.

In some embodiments, the system may receive inputs indicating a beginning increment (e.g., "A" as shown in diagram 300). The system may also determine ending increments (e.g., "R" or "D" as shown in diagram 300). The system may then iteratively determine one or more forks to complete a synthetic subset as shown. In some embodiments, the system may automatically determine the beginning increment and/or the ending increment. For example, the system may determine that one or more increments correspond to a starting condition or resting state for a network. As such, the system may determine that this increment corresponds to a beginning increment. The system may determine that one or more increments correspond to an ending condition or goal. As such, the system may determine that this increment corresponds to an ending increment. As discussed above, the system may exhaustively test every permutation based on an original seeding and then branching when items have the same rating.

The system may record these correspondences in a database and/or other record. The system, in response to a request, may input the request into a database to retrieve one or more increments corresponding to the beginning increment. Similarly, in response to the request, the system may input the request into the database to retrieve one or more increments corresponding to the ending increment.

For example, diagram 300 may represent the system simulating a statistical representation of the potential processing increments (and orders thereof) or a potential processing increment. The system may use randomness in the selection of processing increments in a defined system (e.g., bounded by a beginning and ending processing increment) to evolve and approximate processing pathways without the need to solve for each potential processing pathway analytically. By doing so, the system will eventually determine all potential pathways available as the system moves in a uniform and/or random sense.

Figure 4:
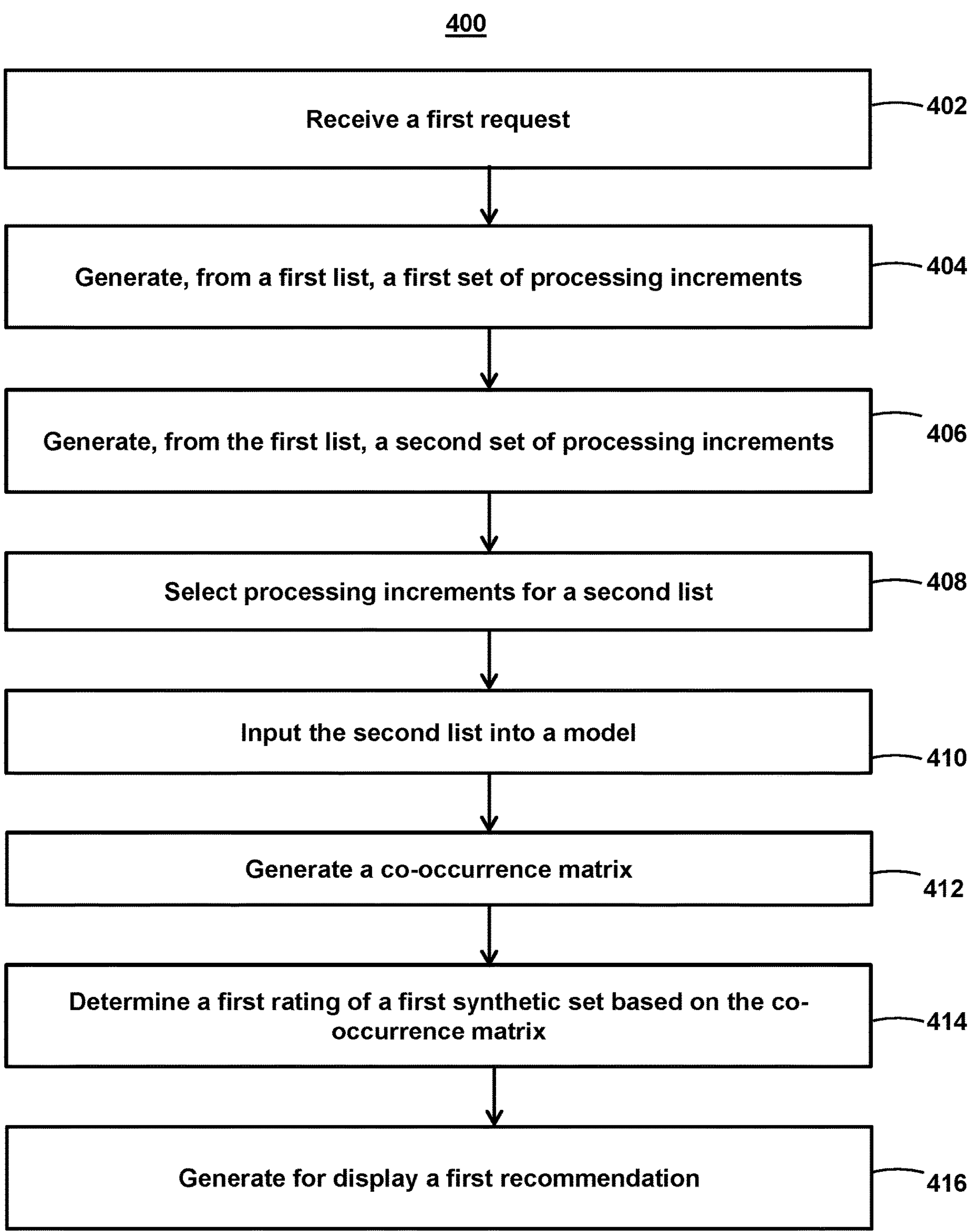
FIG. 4 shows a flowchart for steps involved in generating improved process management by generating synthetic subsets of processing increments, in accordance with one or more embodiments.

FIG. 4 shows a flowchart for steps involved in generating improved process management by generating synthetic subsets of processing increments, in accordance with one or more embodiments. For example, the system may use process 400 to provide optimal processing increments using synthetic subsets of processing increments.

At step 402, process 400 (e.g., using one or more components described in system 100 (FIG. 1)) receives a first request. For example, the system may receive, from a computing device, a first request to generate a synthetic subset of processing increments to perform a first processing pathway. For example, the system may receive a request from a user device to generate a synthetic subset for an improved processing pathway. By doing so, the system is able to determine to transmit a request to the first artificial intelligence model to generate, from a first set of available processing increments, a first subset of processing increments to perform the first processing pathway. Therefore, the system is able to begin to generate synthetic subsets.

At step 404, process 400 (e.g., using one or more components described in system 100 (FIG. 1)) generates, from a first set, a first subset of processing increments. For example, the system may transmit to a first artificial intelligence model a first command to generate, from a first set, a first subset of processing increments. The system may, in response to receiving the first request, transmit to a first artificial intelligence model a first command to generate, from a first set of available processing increments, a first subset of processing increments to perform the first processing pathway, wherein a first subset comprises a first processing increment and a second processing increment. For example, the system may utilize an artificial intelligence model to generate a first subset of processing increments for the improved processing pathway. By doing so, the system is able to ensure that the subsets of processing increments would differ from one another.

In some embodiments, the system may train the first artificial intelligence model using a first algorithm. For example, the first artificial intelligence model is trained to generate a first subset of processing increments for performing the first processing pathway using a first algorithm. The first algorithm determines a first subset from the first set of available processing increments. For example, the first artificial intelligence model may use a first algorithm. The first algorithm may determine a first subset of available processing increments using a neural network. By doing so, the system may ensure a plurality of algorithms are used to generate a diversity of processing increments.

At step 406, process 400 (e.g., using one or more components described in system 100 (FIG. 1)) generates, from the first set, a second subset of processing increments. For example, the system may transmit to a second artificial intelligence model a second command to generate, from a first set, a second subset of processing increments. For example, the system may, in response to receiving the first request, transmit to a second artificial intelligence model a second command to generate, from the first set of available processing increments, a second subset of processing increments to perform the first processing pathway, wherein a second subset comprises a third processing increment and a fourth processing increment. For example, the system may generate a third and fourth processing increment that will differ from the first and second processing increments. By doing so, the system is able to ensure that the processing increments used for the processing pathway are being generated from a plurality of different sources. Therefore, the system is generating an improved process that includes processing increments that would typically not be generated together and increase the variety of the processing pathways. It should be noted that in some embodiments, step 404 and step 406 may occur in parallel, whereas in other embodiments step 404 and step 406 may occur serially. For example, in some embodiments, the system may determine whether to use serial or parallel processing (e.g., in order to conserve current computing and/or storage resources).

In some embodiments, the system may generate a second subset of processing increments using a second algorithm. For example, the second artificial intelligence model is trained to generate a second subset of processing increments for performing the first processing pathway using a second algorithm. The second algorithm selects a second subset of processing increments from the first set of available processing increments. For example, the second algorithm may include a random forest algorithm. By doing so, the system is able to generate a second subset of processing increments.

At step 408, process 400 (e.g., using one or more components described in system 100 (FIG. 1)) selects processing increments for a second set. For example, the system may select the first processing increment, the second processing increment, the third processing increment, and the fourth processing increment for a second set. For example, the system may select the first processing increment, the second processing increment, the third processing increment, and the fourth processing increment, for a second set of available processing increments for performing the first processing pathway, based on the first processing increment, the second processing increment, the third processing increment, and the fourth processing increment being included in the first subset of processing increments or the second subset of processing increments. For example, the system may add all existing processing increments into a second set to generate a synthetic subset of processing increments. By doing so, the system may create a set for the third artificial intelligence model to generate synthetic subsets for the processing pathway.

At step 410, process 400 (e.g., using one or more components described in system 100 (FIG. 1)) inputs the second set into a model. For example, the system may input the second set of available processing increments into a third artificial intelligence model. For example, the system may input the second set of available processing increments into a third artificial intelligence model to determine a plurality of synthetic subsets processing increments to perform the first processing pathway, wherein processing increments for a plurality of synthetic subsets are limited to those occurring in the second set of available processing increments. For example, the system may utilize a third artificial intelligence model to generate a synthetic set. By doing so, the system may ensure the synthetic subset only contains processing increments from the previous models. Therefore, the synthetic subsets that are produced only select processing increments that are highly rated by the models.

In some embodiments, the system may generate synthetic subsets using a third algorithm. For example, the third artificial intelligence model is trained to generate synthetic subsets of processing increments for performing the first processing pathway using a third algorithm. The third algorithm generates synthetic subsets of processing increments from the first subset of processing increments and the second subset of processing increments. For example, the third algorithm may include logistical regression. By doing so, the third artificial intelligence model is able to generate a synthetic subset that is best suited for the processing pathway.

At step 412, process 400 (e.g., using one or more components described in system 100 (FIG. 1)) generates a co-occurrence matrix. For example, the system may generate a co-occurrence matrix based on the first processing increment, the second processing increment, the third processing increment, and the fourth processing increment. For example, the system may generate a co-occurrence matrix based on the first processing increment, the second processing increment, the third processing increment, and the fourth processing increment, wherein the co-occurrence matrix indicates a number of times each of the first processing increment, the second processing increment, the third processing increment, and the fourth processing increment occurred in a first synthetic subset of a plurality of synthetic subsets. For example, the system may generate a co-occurrence matrix to determine which processing increments are grouped together the most according to the models. By doing so, the system is able to generate synthetic subsets based on what processing increments should be grouped together over what is normally grouped together when using only one artificial intelligence model.

In some embodiments, the co-occurrence matrix may indicate a number of times each of the first processing increment, the second processing increment, the third processing increment, and the fourth processing increment occurred in a synthetic subset of the plurality of synthetic subsets. For example, the co-occurrence matrix may indicate the number of times that the first processing increment occurred within a synthetic subset of the plurality of synthetic subsets. By doing so, the co-occurrence matrix is able to record the number of times a processing increment takes place in the plurality of synthetic subsets. Therefore, the processing increment has a greater chance to be used in the processing pathway.

In some embodiments, the co-occurrence matrix indicates a number of times the first processing increment occurred before the second processing increment in a synthetic subset of the plurality of synthetic subsets. By doing so, the co-occurrence matrix is able to record the number of times the first processing increment occurs before the second processing increment. Therefore, the co-occurrence matrix may record how cohesive the first and second processing increments are together in that order.

In some embodiments, the co-occurrence matrix indicates a number of times the first processing increment occurred in parallel with the second processing increment in a synthetic subset of the plurality of synthetic subsets. By doing so, the co-occurrence matrix may record how cohesive the first and second processing increments are together.

In some embodiments, the co-occurrence matrix indicates a number of times the first processing increment occurred with the second processing increment in a synthetic subset of the plurality of synthetic subsets. By doing so, the co-occurrence matrix may record how cohesive the first and second processing increments are together.

At step 414, process 400 (e.g., using one or more components described in system 100 (FIG. 1)) may determine a first rating of a first synthetic subset based on the co-occurrence matrix. For example, the system may determine a first rating of a first synthetic subset based on the co-occurrence matrix. For example, the system may determine the first sum metric in the first synthetic set. By doing so, the system is able to recommend the best synthetic subset to perform the processing pathway. For example, the synthetic subset with the higher first sum metric will create a higher-quality processing pathway.

In some embodiments, the system may determine a first rating of the first synthetic subset based on the co-occurrence matrix. To do so, the system may include determining a first sum metric for the first synthetic set. The first sum metric for the first synthetic subset comprises a sum of a total number of occurrences of the first processing increment in the first synthetic subset and a total number of times the first processing increment in the first synthetic subset occurred with the second processing increment in the first synthetic subset in the plurality of synthetic subsets and a total number of times any additional processing increment in the first synthetic subset occurred with a previous processing increment in the first synthetic set. By doing so, the system is able to measure the effectiveness of a synthetic set.

In some embodiments, the system may determine a second rating of a second synthetic subset of the plurality of synthetic subsets based on the co-occurrence matrix. For example, determining a second rating of the first synthetic subset based on the co-occurrence matrix. To do so, the system may include determining a first sum metric for the second synthetic set, wherein the first sum metric for the second synthetic subset comprises a sum of a total number of occurrences of the first processing increment in the first synthetic subset and a total number of times the first processing increment in the first synthetic subset occurred with the second processing increment in the second synthetic subset in the plurality of synthetic subsets and a total number of times any additional processing increment in the first synthetic subset occurred with a previous processing increment in the second synthetic set. The system may compare the first rating to the second rating. By doing so, the system is able to ensure that the best synthetic subset is recommended to perform the processing pathway.

In some embodiments, the system may compare the first rating to the second rating and may include determining the first sum metric for the first rating is greater than the first sum metric for the second rating. The system may select a recommendation to recommend the first synthetic set. For example, the system may compare ratings between two different synthetic subsets using the first sum metrics. By doing so, the system may determine which synthetic subset to recommend.

In some embodiments, the system may compare the first rating to the second rating, which may include determining whether there is no difference between the first sum metric for the first rating and the first sum metric for the second rating. The system may determine a second sum metric for the first rating, wherein the second sum metric for the first rating comprises a sum of the total number of times each processing increment in the first synthetic subset occurred in the plurality of synthetic subsets. The system may determine a second sum metric for the second rating, wherein the second sum metric for the second rating comprises a sum of the total number of times each processing increment in the second synthetic subset occurred in the plurality of synthetic subsets. For example, the system may compare the second sum metric in the case that the first sum metric is equal. By doing so, the system may ensure the most effective synthetic subset is being recommended.

In some embodiments, the system may determine the second sum metric for the first rating is greater than the second sum metric for the second rating. The system may select a recommendation to recommend the first synthetic set. For example, the system may recommend the first synthetic subset because the second sum metric is higher for the first synthetic. By doing so, the system may ensure the most effective synthetic subset is being recommended.

At step 416, process 400 (e.g., using one or more components described in system 100 (FIG. 1)) may generate for display a first recommendation. For example, the system may generate for display, on a user interface, a first recommendation to perform the first processing pathway using the first synthetic subset based on the first rating. For example, the system may alert the user to which synthetic subset is best used for their processing pathway. By doing so, the system is able to recommend to the user the best synthetic subset for performing the processing pathway.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the steps, devices, or equipment discussed in relation to FIGS. 1-3 could be used to perform one or more of the steps in FIG. 4.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method for generating improved processing pathway management and determining optimal processing increments to complete processing pathway using synthetic subsets of processing increments, the method comprising: receiving, from a computing device, a first request to generate a synthetic subset of processing increments to perform a first processing pathway; and in response to receiving the first request, transmitting: to a first artificial intelligence model a first command to generate, from a first set of available processing increments, a first subset of processing increments to perform the first processing pathway, wherein a first subset comprises a first processing increment and a second processing increment; to a second artificial intelligence model a second command to generate, from the first set of available processing increments, a second subset of processing increments to perform the first processing pathway, wherein a second subset comprises a third processing increment and a fourth processing increment; selecting the first processing increment, the second processing increment, the third processing increment, and the fourth processing increment, for a second set of available processing increments for performing the first processing pathway, based on the first processing increment, the second processing increment, the third processing increment, and the fourth processing increment being included in the first subset of processing increments or the second subset of processing increments; inputting the second set of available processing increments into a third artificial intelligence model to determine a plurality of synthetic subsets processing increments to perform the first processing pathway, wherein processing increments for a plurality of synthetic subsets are limited to those occurring in the second set of available processing increments; generating a co-occurrence matrix based on the first processing increment, the second processing increment, the third processing increment, and the fourth processing increment, wherein the co-occurrence matrix indicates a number of times each of the first processing increment, the second processing increment, the third processing increment, and the fourth processing increment occurred in a first synthetic subset of a plurality of synthetic sets; and determining a first rating of a first synthetic subset based on the co-occurrence matrix; and generating, for display on a user interface, a first recommendation to perform the first processing pathway using the first synthetic subset based on the first rating.

2. The method of any one of the preceding embodiments, wherein the first artificial intelligence model is trained to generate a first subset of processing increments for performing the first processing pathway using a first algorithm, and wherein the first algorithm determines a first subset from the first set of available processing increments.

3. The method of any one of the preceding embodiments, wherein the second artificial intelligence model is trained to generate a second subset of processing increments for performing the first processing pathway using a second algorithm, and wherein the second algorithm selects a second subset of processing increments from the first set of available processing increments.

4. The method of any one of the preceding embodiments, wherein the third artificial intelligence model is trained to generate synthetic subsets of processing increments for performing the first processing pathway using a third algorithm, and wherein the third algorithm generates synthetic subsets of processing increments from the first subset of processing increments and the second subset of processing increments.

5. The method of any one of the preceding embodiments, wherein the co-occurrence matrix indicates a number of times each of the first processing increment, the second processing increment, the third processing increment, and the fourth processing increment occurred in a synthetic subset of the plurality of synthetic subsets.

6. The method of any one of the preceding embodiments, wherein the co-occurrence matrix indicates a number of times the first processing increment occurred before the second processing increment in a synthetic subset of the plurality of synthetic subsets.

7. The method of any one of the preceding embodiments, wherein the co-occurrence matrix indicates a number of times the first processing increment occurred in parallel with the second processing increment in a synthetic subset of the plurality of synthetic subsets.

8. The method of any one of the preceding embodiments, wherein the co-occurrence matrix indicates a number of times the first processing increment occurred with the second processing increment in a synthetic subset of the plurality of synthetic subsets.

9. The method of any one of the preceding embodiments, wherein determining a first rating of the first synthetic subset based on the co-occurrence matrix comprises: determining a first sum metric for the first synthetic set, wherein the first sum metric for the first synthetic subset comprises a sum of a total number of occurrences of the first processing increment in the first synthetic subset and a total number of times the first processing increment in the first synthetic subset occurred with the second processing increment in the first synthetic subset in the plurality of synthetic subsets and a total number of times any additional processing increment in the first synthetic subset occurred with a previous processing increment in the first synthetic set.

10. The method of any one of the preceding embodiments, further comprising: determining a second rating of a second synthetic subset of the plurality of synthetic subsets based on the co-occurrence matrix, wherein determining a second rating of the first synthetic subset based on the co-occurrence matrix comprises: determining a first sum metric for the second synthetic set, wherein the first sum metric for the second synthetic subset comprises a sum of a total number of occurrences of the first processing increment in the first synthetic subset and a total number of times the first processing increment in the first synthetic subset occurred with the second processing increment in the second synthetic subset in the plurality of synthetic subsets and a total number of times any additional processing increment in the first synthetic subset occurred with a previous processing increment in the second synthetic set; and comparing the first rating to the second rating.

11. The method of any one of the preceding embodiments, wherein comparing the first rating to the second rating comprises: determining the first sum metric for the first rating is greater than a first sum metric for the second rating and selecting a recommendation to recommend the first synthetic set.

12. The method of any one of the preceding embodiments, wherein comparing the first rating to the second rating further comprises: determining there is no difference between the first sum metric for the first rating and the first sum metric for the second rating; determining a second sum metric for the first rating, wherein the second sum metric for the first rating comprises a sum of a total number of times each processing increment in the first synthetic subset occurred in the plurality of synthetic sets; and determining a second sum metric for the second rating, wherein the second sum metric for the second rating comprises a sum of a total number of times each processing increment in the second synthetic subset occurred in the plurality of synthetic subsets.

13. The method of any one of the preceding embodiments, further comprising: determining the second sum metric for the first rating is greater than the second sum metric for the second rating and selecting a recommendation to recommend the first synthetic set.

14. A tangible, non-transitory, machine-readable medium storing instructions that, when executed by a data processing apparatus, cause the data processing apparatus to perform operations comprising those of any of embodiments 1-13.

15. A system comprising: one or more processors; and memory-storing instructions that, when executed by the processors, cause the processors to effectuate operations comprising those of any of embodiments 1-13.

16. A system comprising means for performing any of embodiments 1-13.

What is claimed is:

1. A system for generating improved processing pathway management and determining optimal processing increments to complete processing pathway using synthetic subsets of processing increments, the system comprising:

one or more processors; and a non-transitory computer-readable storage medium storing instructions, which when executed by the one or more processors cause the one or more processors to perform operations comprising:

accessing a database comprising a hierarchical tree for a plurality of nodes based on relationships between the plurality of nodes;

receiving, from a computing device, a first request to generate a synthetic subset of processing increments to execute a first processing pathway, wherein the first processing pathway occurs across a computer network, wherein the first processing pathway uses a plurality of processing increments, and wherein each of the plurality of processing increments corresponds to a respective node of the plurality of nodes;

in response to receiving the first request, transmitting:

to a first artificial intelligence model a first command to generate, from a first set of available processing increments, a first subset of processing increments to execute the first processing pathway, wherein the first artificial intelligence model is trained to generate the first subset using a first algorithm, and wherein the first algorithm determines the first subset from the first set of available processing increments; and to a second artificial intelligence model a second command to generate, from the first set of available processing increments, a second subset of processing increments to perform execute the first processing pathway, wherein the first artificial intelligence model is trained to generate the second subset using a second algorithm, and wherein the second algorithm selects the second subset from the first set of available processing increments;

inputting the first subset of processing increments and the second subset of processing increments into a third artificial intelligence model to determine a plurality of synthetic subsets of processing increments to execute the first processing pathway, wherein the third artificial intelligence model is trained to generate synthetic subsets of processing increments for performing the first processing pathway using a third algorithm, and wherein the third algorithm generates the synthetic subsets using the first subset and the second subset;

generating a co-occurrence matrix for the plurality of synthetic subsets, wherein the co-occurrence matrix indicates a number of times any one of the plurality of processing increments occurred in one or more of the plurality of synthetic subsets;

calculating a first rating of a first synthetic subset of the plurality of synthetic subsets based on the co-occurrence matrix; and executing the first processing pathway across the computer network using the first synthetic subset based on the first rating.

2. A method for generating improved processing pathway management and determining optimal processing increments to complete processing pathway using synthetic subsets of processing increments, the method comprising:

receiving, from a computing device, a first request to generate a synthetic subset of processing increments to execute a first processing pathway, wherein the first processing pathway occurs across a computer network, wherein the first processing pathway uses a plurality of processing increments, and wherein each of the plurality of processing increments corresponds to a respective node of a plurality of nodes;

in response to receiving the first request, transmitting:

to a first artificial intelligence model a first command to generate, from a first set of available processing increments, a first subset of processing increments to execute the first processing pathway, wherein the first artificial intelligence model is trained to generate the first subset of processing increments for performing the first processing pathway using a first algorithm, and wherein the first algorithm determines the first subset of processing increments from the first set of available processing increments; and to a second artificial intelligence model a second command to generate, from the first set of available processing increments, a second subset of processing increments to execute the first processing pathway, wherein the second artificial intelligence model is trained to generate the second subset of processing increments for performing the first processing pathway using a second algorithm, and wherein the second algorithm selects the second subset of processing increments from the first set of available processing increments;

inputting the first subset of processing increments and the second subset of processing increments into a third artificial intelligence model to determine a plurality of synthetic subsets of processing increments to execute the first processing pathway;

generating a co-occurrence matrix for the plurality of synthetic subsets, wherein the co-occurrence matrix indicates a number of times any one of the plurality of processing increments occurred in one or more of the plurality of synthetic subsets;

calculating a first rating of a first synthetic subset of the plurality of synthetic subsets based on the co-occurrence matrix; and executing, based on the first rating, the first processing pathway across the computer network using the first synthetic subset.

3. The method of claim 2, wherein the third artificial intelligence model is trained to generate the synthetic subsets of processing increments for performing the first processing pathway using a third algorithm, and wherein the third algorithm generates the synthetic subsets of processing increments from the first subset of processing increments and the second subset of processing increments.

4. The method of claim 2, wherein the co-occurrence matrix indicates a number of times each of a first processing increment and a second processing increment occurred in the first synthetic subset of the plurality of synthetic subsets.

5. The method of claim 2, wherein the co-occurrence matrix indicates a number of times a first processing increment occurred before a second processing increment in the first synthetic subset of the plurality of synthetic subsets.

6. The method of claim 2, wherein the co-occurrence matrix indicates a number of times a first processing increment occurred in parallel with a second processing increment in the first synthetic subset of the plurality of synthetic subsets.

7. The method of claim 2, wherein the co-occurrence matrix indicates a number of times a first processing increment occurred with a second processing increment in the first synthetic subset of the plurality of synthetic subsets.

8. The method of claim 2, wherein calculating the first rating of the first synthetic subset based on the co-occurrence matrix comprises:

calculating a first sum metric for the first synthetic subset, wherein the first sum metric for the first synthetic subset comprises a sum of a total number of occurrences of a first processing increment in the first synthetic subset and a total number of times the first processing increment in the first synthetic subset occurred with a second processing increment in the first synthetic subset in the plurality of synthetic subsets and a total number of times any additional processing increment in the first synthetic subset occurred with a previous processing increment in the first synthetic subset.

9. The method of claim 2, further comprising:

calculating a second rating of a second synthetic subset of the plurality of synthetic subsets based on the co-occurrence matrix, wherein calculating the second rating of the second synthetic subset based on the co-occurrence matrix comprises:

calculating first sum metric for the second synthetic subset, wherein the first sum metric for the second synthetic subset comprises a sum of a total number of occurrences of a first processing increment in the first synthetic subset and a total number of times the first processing increment in the first synthetic subset occurred with a second processing increment in the second synthetic subset in the plurality of synthetic subsets and a total number of times any additional processing increment in the first synthetic subset occurred with a previous processing increment in the second synthetic subset; and comparing the first rating to the second rating.

10. The method of claim 9, wherein comparing the first rating to the second rating comprises:

calculating the first sum metric for the first rating is greater than a second sum metric for the second rating; and selecting a recommendation to recommend the first synthetic subset.

11. The method of claim 10, wherein comparing the first rating to the second rating further comprises:

calculating there is no difference between the first sum metric for the first rating and the first sum metric for the second rating;

calculating a second sum metric for the first rating, wherein the second sum metric for the first rating comprises a sum of a total number of times each processing increment in the first synthetic subset occurred in the plurality of synthetic subsets; and calculating a second sum metric for the second rating, wherein the second sum metric for the second rating comprises a sum of a total number of times each processing increment in the second synthetic subset occurred in the plurality of synthetic subsets.

12. The method of claim 11, further comprising:

calculating the second sum metric for the first rating is greater than the second sum metric for the second rating; and selecting a recommendation to recommend the first synthetic subset.

13. A non-transitory computer-readable medium having instructions recorded thereon that when executed by one or more processors cause operations comprising:

receiving, from a computing device, a first request to generate a synthetic subset of processing increments to execute a first processing pathway;

in response to receiving the first request, transmitting:

to a first artificial intelligence model a first command to generate, from a first set of available processing increments, a first subset of processing increments to execute the first processing pathway, wherein the first artificial intelligence model is trained to generate the first subset of processing increments for performing the first processing pathway using a first algorithm, and wherein the first algorithm determines the first subset of processing increments from the first set of available processing increments; and to a second artificial intelligence model a second command to generate, from the first set of available processing increments, a second subset of processing increments to execute the first processing pathway, wherein the second artificial intelligence model is trained to generate the second subset of processing increments for performing the first processing pathway using a second algorithm, and wherein the second algorithm selects the second subset of processing increments from the first set of available processing increments;

inputting the first subset of processing increments and the second subset of processing increments into a third artificial intelligence model to determine a plurality of synthetic subsets processing increments to execute the first processing pathway;

generating a co-occurrence matrix for the plurality of synthetic subsets, wherein the co-occurrence matrix indicates a number of times any one of a plurality of processing increments occurred in one or more of the plurality of synthetic subsets;

calculating a first rating of a first synthetic subset of the plurality of synthetic subsets based on the co-occurrence matrix; and generating for display, on a user interface, a first recommendation to executing, based on the first rating, the first processing pathway across a computer network using the first synthetic subset.

14. The non-transitory computer-readable medium of claim 13, wherein the co-occurrence matrix indicates a number of times each of a first processing increment and a second processing increment occurred in the first synthetic subset of the plurality of synthetic subsets.

15. The non-transitory computer-readable medium of claim 13, wherein the co-occurrence matrix indicates a number of times a first processing increment occurred with a second processing increment in the first synthetic subset of the plurality of synthetic subsets.

16. The non-transitory computer-readable medium of claim 13, wherein calculating the first rating of the first synthetic subset based on the co-occurrence matrix comprises calculating a first sum metric for the first synthetic subset, wherein the first sum metric for the first synthetic subset comprises a sum of a total number of occurrences of a first processing increment in the first synthetic subset and a total number of times the first processing increment in the first synthetic subset occurred with a second processing increment in the first synthetic subset in the plurality of synthetic subsets and a total number of times any additional processing increment in the first synthetic subset occurred with a previous processing increment in the first synthetic subset.

17. The non-transitory computer-readable medium of claim 13, wherein the instructions further cause operations comprising:

calculating a second rating of a second synthetic subset of the plurality of synthetic subsets based on the co-occurrence matrix, wherein calculating the second rating of the first synthetic subset based on the co-occurrence matrix comprises:

calculating a first sum metric for the second synthetic subset, and wherein the first sum metric for the second synthetic subset comprises a sum of a total number of occurrences of a first processing increment in the first synthetic subset and a total number of times the first processing increment in the first synthetic subset occurred with a second processing increment in the second synthetic subset in the plurality of synthetic subsets and a total number of times any additional processing increment in the first synthetic subset occurred with a previous processing increment in the second synthetic subset; and comparing the first rating to the second rating.

18. The non-transitory computer-readable medium of claim 17, wherein comparing the first rating to the second rating comprises:

calculating a first sum metric for the first rating is greater than a first sum metric for the second rating; and selecting a recommendation to recommend the first synthetic subset.

19. The non-transitory computer-readable medium of claim 13, wherein the co-occurrence matrix indicates a number of times a first processing increment occurred before a second processing increment in the first synthetic subset of the plurality of synthetic subsets.

20. The non-transitory computer-readable medium of claim 13, wherein the co-occurrence matrix indicates a number of times a first processing increment occurred in parallel with a second processing increment in the first synthetic subset of the plurality of synthetic subsets.

* * * * *